(12) United States Patent
Kato et al.

(10) Patent No.: US 6,975,870 B2
(45) Date of Patent: Dec. 13, 2005

(54) MOBILE COMMUNICATION TERMINAL

(75) Inventors: Hisatomo Kato, Daito (JP); Naritatsu Yamamoto, Osaka (JP)

(73) Assignees: Sanyo Electric Co., Ltd., Moriguchi (JP); Sanyo Telecommunications Co., Ltd., Daito (JP)

( * ) Notice: Subject to any disclaimer, the term of this patent is extended or adjusted under 35 U.S.C. 154(b) by 496 days.

(21) Appl. No.: 10/119,685

(22) Filed: Apr. 11, 2002

(65) Prior Publication Data

US 2002/0187792 A1 Dec. 12, 2002

(30) Foreign Application Priority Data

Jun. 7, 2001 (JP) ............... 2001-172531

(51) Int. Cl.[7] ............................................. H04Q 7/20
(52) U.S. Cl. ................ 455/456.1; 455/456.3
(58) Field of Search ............... 455/524, 525, 455/561, 423, 550, 430, 456.1, 456.3, 452.2, 455/424, 513, 462, 504, 437, 457, 12.1; 375/150; 342/463

(56) References Cited

U.S. PATENT DOCUMENTS

| | | | | |
|---|---|---|---|---|
| 5,121,096 A | * | 6/1992 | Moore et al. ............... 340/326 |
| 5,173,710 A | * | 12/1992 | Kelley et al. ............... 342/463 |
| 5,666,662 A | * | 9/1997 | Shibuya ................... 455/456.4 |
| 5,794,129 A | * | 8/1998 | Komatsu .................... 455/69 |
| 5,805,999 A | * | 9/1998 | Inoue ....................... 455/462 |
| 5,812,949 A | * | 9/1998 | Taketsugu .................. 455/439 |
| 5,926,757 A | * | 7/1999 | Luijten et al. ............ 455/422.1 |
| 6,058,310 A | * | 5/2000 | Tokuyoshi ................ 455/435.3 |
| 6,064,890 A | * | 5/2000 | Hirose et al. .............. 455/513 |
| 6,070,079 A | * | 5/2000 | Kuwahara ................ 455/456.2 |
| 6,148,195 A | * | 11/2000 | Schuchman et al. ........ 455/424 |
| 6,181,253 B1 | * | 1/2001 | Eschenbach et al. ... 340/825.37 |
| 6,229,844 B1 | * | 5/2001 | Kong ....................... 375/150 |
| 6,408,189 B1 | * | 6/2002 | Nakamura et al. .......... 455/504 |
| 6,442,393 B1 | * | 8/2002 | Hogan ..................... 455/456.5 |
| 6,539,300 B2 | * | 3/2003 | Myr ........................ 701/117 |
| 6,542,716 B1 | * | 4/2003 | Dent et al. ................ 455/13.1 |
| 6,556,834 B1 | | 4/2003 | Kobayashi et al. ......... 455/452 |
| 6,594,494 B1 | * | 7/2003 | Kakehi ..................... 455/437 |
| 6,845,239 B1 | * | 1/2005 | Sato et al. ............... 455/456.1 |
| 2001/0034239 A1 | * | 10/2001 | Yamato et al. ............. 455/456 |
| 2002/0049063 A1 | * | 4/2002 | Nohara et al. ............. 455/456 |
| 2002/0061754 A1 | * | 5/2002 | Takano .................... 455/456 |

FOREIGN PATENT DOCUMENTS

| | | |
|---|---|---|
| CN | 1275294 A | 11/2000 |
| CN | 1286841 A | 3/2001 |
| DE | WO 99/33196 * | 7/1999 |
| JP | 2-171039 | 7/1990 |
| JP | 8-84363 | 3/1996 |

(Continued)

OTHER PUBLICATIONS

Chinese Office Action (mail date Dec. 12, 2003).

(Continued)

*Primary Examiner*—William Trost
*Assistant Examiner*—Kiet Doan
(74) *Attorney, Agent, or Firm*—Armstrong, Kratz, Quintos, Hanson & Brooks, LLP

(57) ABSTRACT

A mobile communication terminal including a radio unit for establishing radio communications with radio base stations, a GPS receiving unit for measuring a position of its own, and a control unit. The control unit detects reception condition of radio waves from a radio base station and a distance to the station, selecting the most suitable radio base station to be communicated with based on the detected results.

2 Claims, 5 Drawing Sheets

FOREIGN PATENT DOCUMENTS

| | | |
|---|---|---|
| JP | 11-4470 | 1/1999 |
| JP | 2000-197090 | 7/2000 |
| JP | 2000-341737 | 12/2000 |
| JP | 2001-69548 | 3/2001 |
| JP | 2001-103532 | 4/2001 |
| JP | 2002-27519 | 1/2002 |
| WO | WO/13430 | 3/2000 |

OTHER PUBLICATIONS

Chinese Patent Office Action for corresponding Chinese Patent Application No. 021243166 dated Aug. 6, 2004.

* cited by examiner

MOBILE COMMUNICATION TERMINAL

FIELD OF THE INVENTION

1. Field of the Invention

The present invention relates to mobile communication terminals such as portable telephones for establishing radio communications with radio base stations on the ground.

2. Description of the Related Art

Conventional portable telephones select one radio base station from which the telephone will receive the radio signal in a satisfactory condition from among a plurality of radio base stations arranged on the ground, and establishing radio communications with the selected base station to thereby realize voice communications with another terminal. In selection of a radio base station, electric field strength and Ec/Io value (hereinafter referred to collectively as "reception condition value") of radio waves from the selected radio base station is measured at all times in order to judge whether the reception condition is satisfactory. When the reception condition value is below a predetermined threshold value, another radio base station in the satisfactory reception condition is selected. Thus, when the portable telephone is moving, the radio base station is successively switched over, continuing the voice communications.

In a system wherein a base station is switched (handed-over) according to reception condition value of electric field strength and Ec/Io value of received radio waves, it is known as so called "overreach" phenomenon occurring that even though a radio base station from which the telephone receives radio waves with satisfactory strength is selected, the base station exists at remote place, such that the radio waves from the telephone do not reach the station with satisfactory strength. There arises the problem of the overreach phenomenon, which disables the user of the portable telephone from receiving an incoming call during a call-waiting state of the telephone, or which causes the failure of the hand-over during a calling state.

SUMMARY OF THE INVENTION

An object of the present invention is to provide a mobile communication terminal adapted to select a suitable radio base station free from the problem of overreach.

The present invention accomplishes the object described above by introducing to the mobile communication terminal a positioning function such as the function of the GPS (Global Positioning System) which is in actual use in car navigation systems. In other words, the mobile communication terminal of the invention selects at least one radio base station from a plurality of radio base stations arranged on the ground, the terminal comprising a radio communication function for establishing radio communications with the selected base station and a positioning function for measuring a position of the terminal based on reference location data from a plurality of location reference stations arranged on satellites and/or the ground, the terminal detecting reception condition of radio waves from the radio base station and a distance to the radio base station, and selecting a radio base station to be radio-communicated with based on the detected results.

The mobile communication terminal of the invention described adopts, as a standard for selecting a base station, the distance to a radio base station detected by the positioning function in addition to the conventionally adopted standard for selecting a base station, i.e., the reception condition of radio waves from a radio base station to select the radio base station to be radio-communicated with, so that, for example, in the case where the distance to a radio base station is long even though radio waves from the radio base station to be selected are received in a satisfactory condition, the radio base station is not selected, searching for other radio base stations with the result of selecting a radio base station at a short distance. Accordingly, the conventional problem of overreach does not occur.

Stated specifically, a mobile communication terminal of the present invention comprises:

means for detecting whether the reception condition of radio waves from a radio base station is satisfactory, means for searching other one or a plurality of radio stations in a satisfactory reception condition when the reception condition of radio waves from the selected radio base station becomes impaired, and means for detecting a distance to each radio base station by means of the positioning function when other one or a plurality of radio stations in the satisfactory reception condition are found, and selecting a radio base station at the closest distance to be radio-communicated with.

According to the specific construction, when the radio base station needs to be switched upon the reception condition of the radio waves from the selected radio base station becoming impaired, other one or a plurality of radio stations in the satisfactory reception condition are searched based on a reception condition value at first. A distance to each radio base station, thereafter, is detected by the positioning function, selecting from among the searched stations a radio base station at the shortest distance as a new station to be radio-communicated with. Thus, in the case where the distance to a certain base station is long even if the radio base station is selected based on the reception condition value as a standard as conventionally practiced, the station will not be selected as long as other base station at a short distance exists. This obviates the problem of overreach.

According to another specific construction, the mobile communication terminal embodying the invention comprises:

means for detecting whether the reception condition of radio waves from a radio base station is satisfactory, means for recognizing a moving direction of the terminal by means of the positioning function upon the reception condition of the radio waves from the selected radio base station becoming impaired, and searching one or a plurality of radio stations which exist in the moving direction, and means for making an inquiry to one or a plurality of the searched radio base stations in the order of being close to the terminal whether the reception condition of the radio waves is satisfactory, and selecting a radio base station in the satisfactory reception condition to be communicated with.

Stated specifically, when the selected radio base station needs to be switched upon the reception condition of the radio waves from the radio base station becoming impaired, the moving direction, at first, is recognized by means of the positioning function, searching one or a plurality of radio base stations which exist in the moving direction. An inquiry, thereafter, is made to one or a plurality of the searched radio base stations in the order of being close to the terminal whether the reception condition of the radio waves is satisfactory, selecting a new radio base station in the satisfactory reception condition to be communicated with. Accordingly, as long as the reception condition is satisfactory, a radio base station at a short distance has a priority to be selected from among the radio base stations which exist in the moving direction, and a radio base station in a long distance will never be selected. This obviates the problem of overreach.

As described above, with the mobile communication terminal of the present invention, the most suitable radio base station free from the problem of overreach can be selected.

DETAILED DESCRIPTION OF EMBODIMENTS

Figure 1:
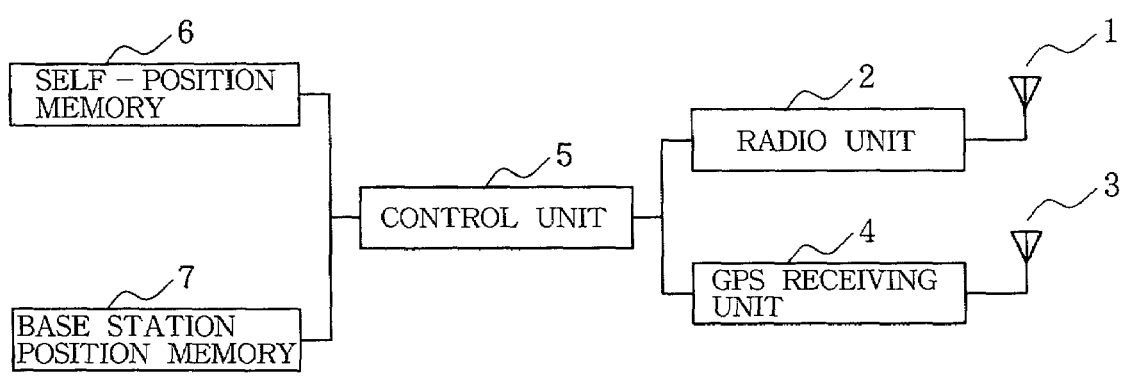
FIG. 1 is a block diagram showing the construction of a portable telephone embodying the present invention.

With reference to the drawings, a detailed description will be given of the present invention as embodied into a portable telephone. The portable telephone embodying the present invention, as shown in FIG. 1, comprises a radio unit 2 for establishing voice communications with other terminals by performing radio communications with another radio base station, a GPS receiving unit 4 for measuring the position of the telephone based on reference location data sent from satellites, a control unit 5 for controlling the operation of the radio unit 2 and the GPS receiving unit 4, a self-position memory 6 for storing the position of the telephone measured by the GPS receiving unit 4, and a base station position memory 7 for storing base station position information obtained by communications with radio base stations. The radio unit 2 and the GPS receiving unit 4 are connected to a telephone antenna 1 and a GPS antenna 3, respectively.

The control unit 5 detects the reception condition value including electric field strength or Ec/Io value and the like, of radio waves from radio base stations, and also detects a distance to a radio base station based on the position of the telephone stored in the self-position memory 6 and the base station position information stored in the base station position memory 7, selecting the most suitable radio base station to be radio-communicated with based on the reception condition value and the distance detected.

Figure 2:
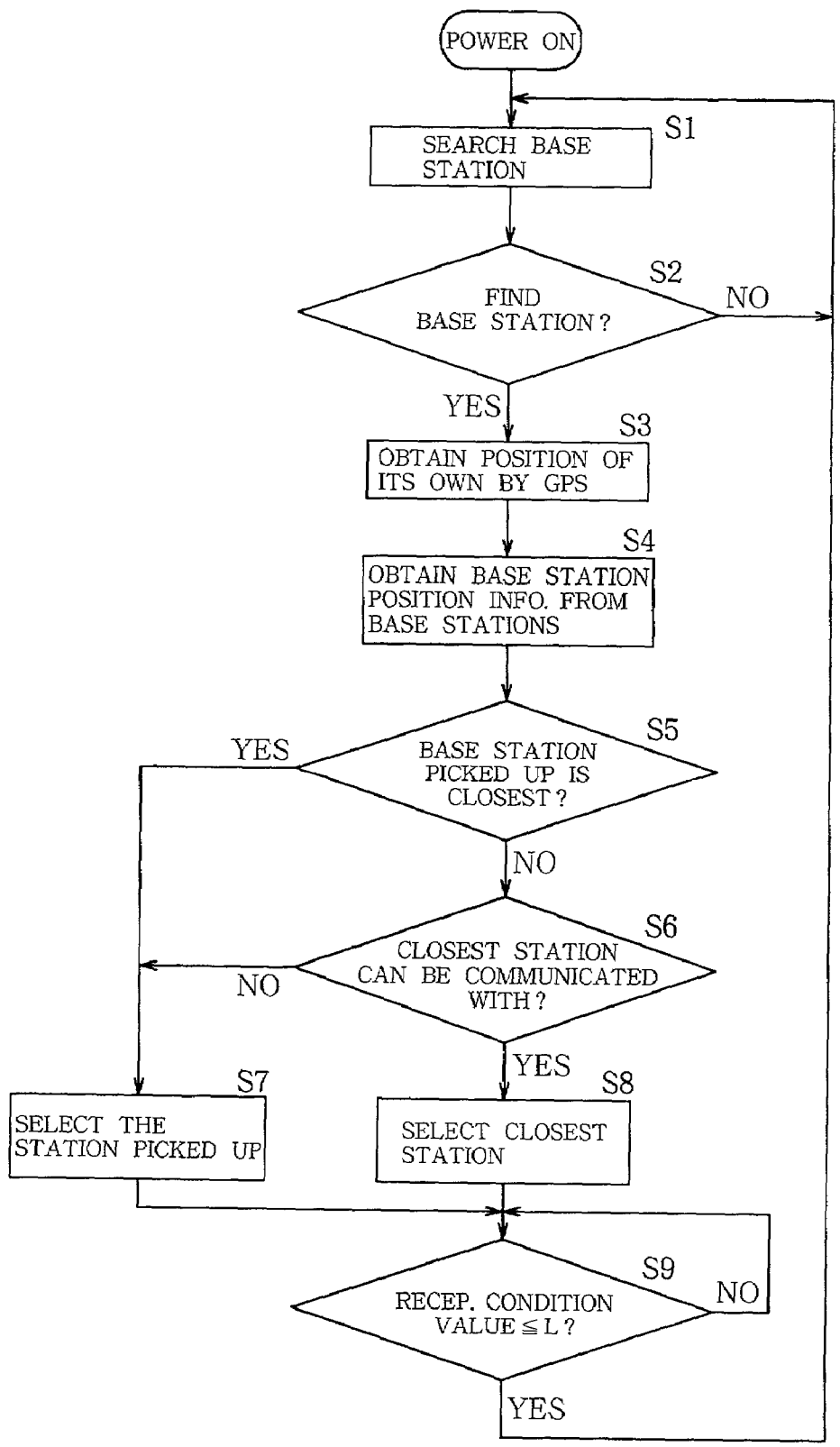
FIG. 2 is a flow chart showing a procedure for selecting a radio base station to be executed by the portable telephone.

FIG. 2 shows a procedure to be executed by the control unit 5 for selecting a radio base station. With a power supply of the telephone turned on, a base station is searched first in step S1 based on the reception condition value. Step S2 inquires whether a base station in a satisfactory reception condition is found. If the inquiry is answered in the negative, step S1 follows again to repeat the search of the base station. When the answer for step S2 is affirmative with one or a plurality of base stations in the satisfactory condition found, step S3 follows to obtain a position of the telephone by means of GPS, storing the position obtained in the self-position memory 6. In step S4, the base station position information is, thereafter, obtained from the one or a plurality of base stations that have been found, storing the information obtained in the base station position memory 7.

Subsequently, step S5 inquires whether the base station which is being picked up is the closest to the telephone. If the answer is affirmative, step S7 follows to select the base station which is being picked up. Conversely when the answer for step S5 is negative, step S6 follows to inquire whether the closest base station can be communicated with the telephone based on the reception condition value. If the answer is negative, step S7 follows to select the base station which is being picked up. On the other hand, when the answer for step S6 is affirmative, step S8 follows to select the closest base station. As a result, communications with the selected base station start for a call.

In step S9 an inquiry is thereafter made whether each reception condition value is equal to or below a predetermined threshold value L. If the answer is negative, the communications with the selected base station is continued. Conversely when the answer is affirmative, step S1 follows again to search a base station to be communicated with.

With the procedure described, when the reception condition of radio waves from the selected radio base station becomes impaired and there arises a need to switch the radio base station, a radio base station in a satisfactory reception condition is searched first based on the reception condition value (step S1). Thereafter, a distance to each radio station is detected, selecting the closest radio base station of the radio base stations searched (step S7, S8).

Figure 4:
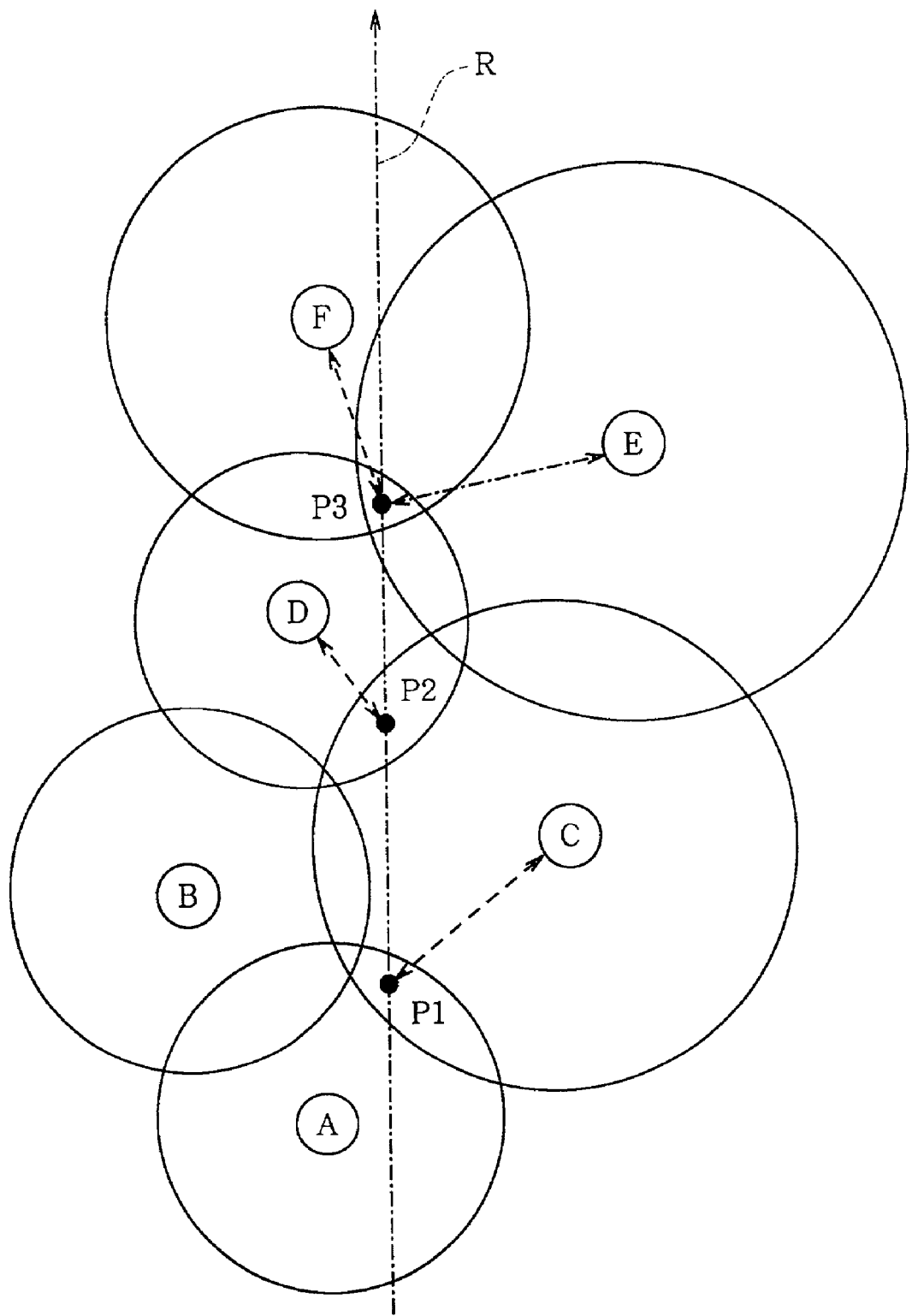
FIG. 4 is a diagram for illustrating an example of selecting a base station according to the procedure shown in FIG. 2.

To take an example as shown in FIG. 4, radio base stations A, B, C, D, E, and F exist, respectively, along with a moving route R of the portable telephone. If the reception condition of the telephone becomes impaired at a position P1 with the telephone passing through a communication area of the station A, the station C will be selected since the telephone can communicate only with the station C at the position P1 (step S7). Subsequently, if the reception condition becomes impaired at a position P2 with the telephone passing through a communication area of the station C, the base station D will be selected in the same manner. Thereafter, if the reception condition becomes impaired at a position P3 with the telephone passing through a communication area of the base station D, the base station F at a closer distance will be selected since the telephone can communicate with the base stations E and F, respectively, at the position P3, and each distance to the two stations are detected, selecting the station F at a closer distance.

With the conventional portable telephones, in the case where radio waves from the station E are received by the telephone at the position P3 with satisfactory strength to select the station E, overreach will occur due to the long distance to the station E, to disable the telephone from receiving an incoming call during a call-waiting state, or to fail hand-over operation during a calling state. On the other hand, with the portable telephone of the invention, the station F in the closer distance is selected from the two stations E and F to be communicated with, obviating the problem of overreach.

Figure 3:
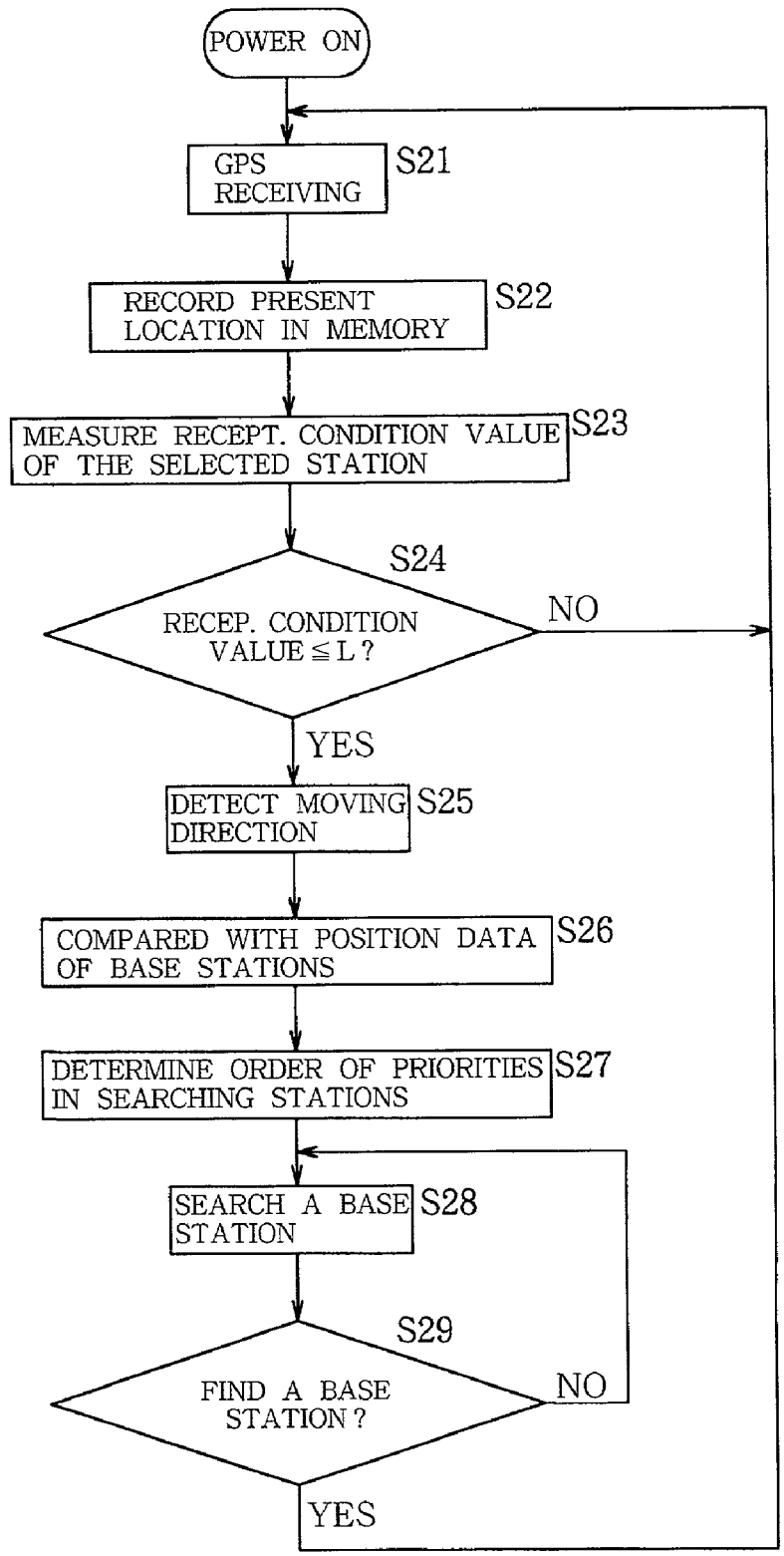
FIG. 3 is a flow chart showing a procedure for selecting other radio base stations.

FIG. 3 shows the other procedure to be executed by the control unit 5 for selecting a radio base station. With a power supply of the telephone turned on, a present location of the telephone is measured by means of GPS first in step S21. In step S22, the present location of the telephone is stored in the self-position memory 6. Subsequently, step S23 measures a reception condition value of the selected base station. In step S24, an inquiry is made whether the reception condition value is equal to or below the predetermined value L. If the answer is negative, step S21 follows to continue the communications with the selected base station.

Thereafter, with the reception condition becoming impaired, the inquiry for step S24 is answered in the affirmative, followed by step S25 to detect the moving direction of the telephone based on the past positions of the telephone stored in the self-position memory 6. Next in step S26, the moving direction of the telephone is compared with position data of a plurality of base stations stored in the base station position memory 7. Step S27 extracts a plurality of base stations exiting in the moving direction to determine among these stations the order of priorities in distance being close to a base station.

In step S28, a base station in a satisfactory reception condition is searched in the order of descending priorities based on the reception condition value. Step S29 inquires whether a base station in the satisfactory condition is found. If the inquiry is answered in the negative, step S28 follows again to repeat the search of the base station. When the answer for step S29 is affirmative with the base station in the satisfactory reception condition found, the base station is selected as a party to be communicated with, and then step S21 follows again to repeat the same procedure.

According to the procedure described, when there arises a need to switch the radio base station since the reception condition of the radio waves from the selected radio base station becomes impaired, the moving direction is detected by means of GPS measuring function at first (step S25), and thereafter an inquiry is made to one or a plurality of radio base stations existing in the moving direction in the order of being close to the telephone whether the reception condition of the radio waves is satisfactory, searching a radio base station in the satisfactory reception condition (step S28).

Figure 5:
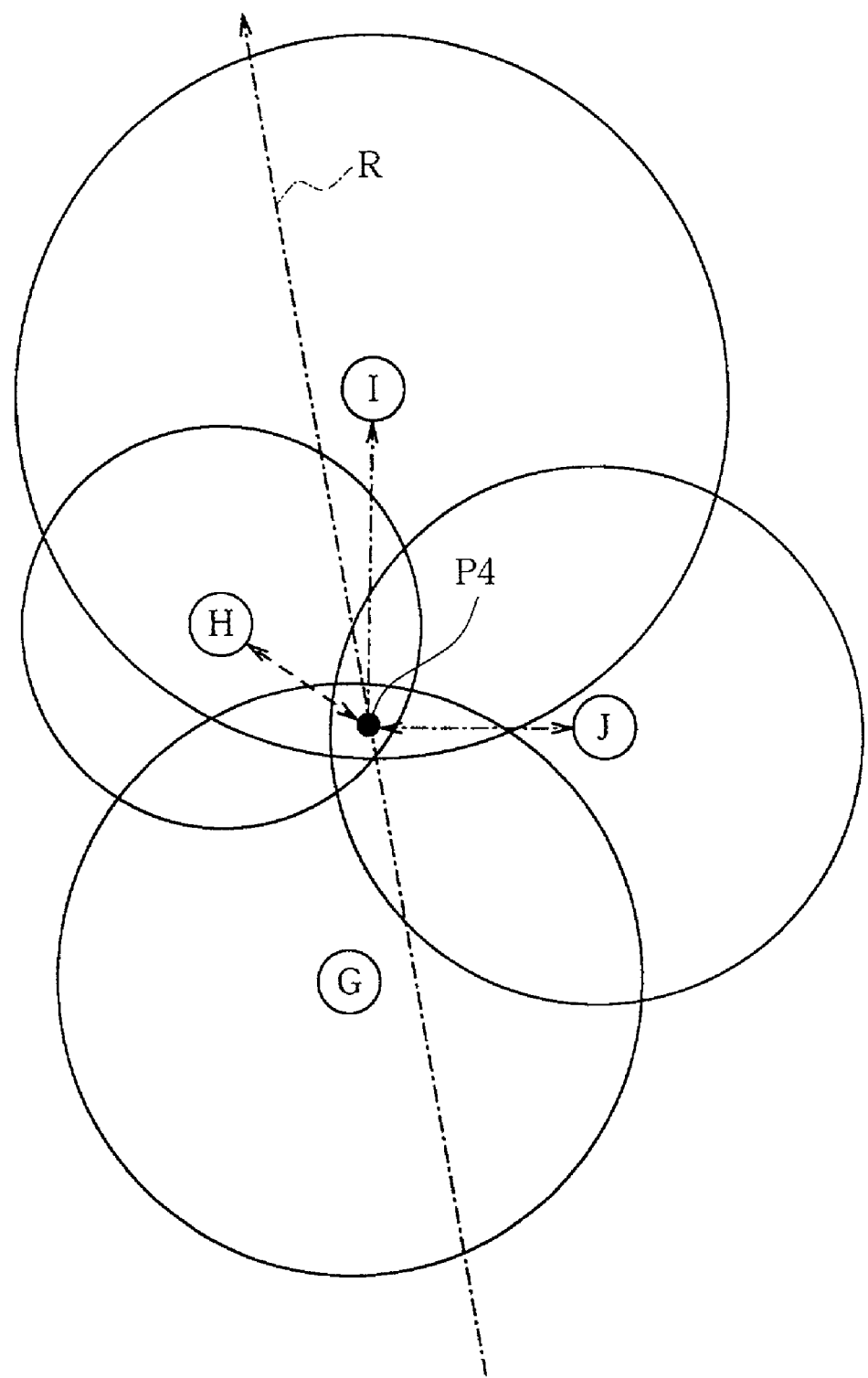
FIG. 5 is a diagram for illustrating an example of selecting a base station according to the procedure shown in FIG. 3.

To take an example as shown in FIG. 5, in the case where the reception condition becomes impaired at a position P4 while the portable telephone moves along the route R in the communication area of the radio base station G, the direction of the moving route R is first detected at the position P4 to search radio base stations existing in the moving direction. In the example illustrated, three base stations H, I, and J exist in the vicinity of the position P4. While the base station J is not located in the subsequent moving direction but moves away in terms of a position of each station and the direction of the moving route R, the base stations H and I exist in the moving direction. Thus, each distance to the base stations H and I existing in the moving direction is measured to give high priority to the station H positioned at a closer distance. The reception condition of radio waves is determined first for the station H given high priority, with the result that the station H is selected.

With the conventional portable telephone, there is a possibility of receiving radio waves from the station I and the station J with a satisfactory strength at the position P4, and of selecting these stations I and J. If the base station I is selected, overreach will occur due to the long distance to the station I, to disable the telephone from receiving an incoming call during a call-waiting state, or to fail hand-over operation during a calling state. Further, if the base station J is selected, the distance to the station J will become increased as the telephone moves, thus entailing the problem of overreach.

On the other hand, with the portable telephone of the present invention, the station J to which the distance will be increased as the telephone moves is eliminated from among the three stations H, I, J to be communicated with, to reduce the number of the stations to be searched, selecting the station H at a close distance from among the stations H and I existing in the moving direction, thereby realizing reduced time in searching and obviating overreach.

The mobile communication terminal is not limited to the foregoing embodiments in construction but can be modified variously by one skilled in the art without departing from the spirit of the invention as set forth in the appended claims. For example, in selecting a radio base station based on the reception condition of radio waves from the radio base station and the distance to the radio base station, the procedure need not be limited to the one shown in FIGS. 2 and 3, but can be modified variously as an inquiry involving the moving direction is added.

What is claimed is:

1. A mobile communication terminal selecting at least one radio base station from a plurality of radio base stations arranged on the ground, the mobile terminal comprising:

a radio communication function for establishing radio communications with the selected base station;

a positioning function for measuring a position of the mobile terminal based on reference location data from a plurality of location reference stations which are at least one of satellite-based and ground-based, the terminal detecting reception condition of radio waves from the radio base station and a distance to the radio base station, and selecting the radio base station to be radio-communicated with based on the detected results;

means for detecting whether the reception condition of radio waves from a radio base station is satisfactory;

means for recognizing a moving direction of the mobile terminal by means of the positioning function upon the reception condition of the radio waves from the selected radio base station becoming impaired, and searching at least one radio station which exists in the moving direction; and means for making an inquiry to said at least one searched radio base station in the order of being close to the mobile terminal whether the reception condition of the radio waves is satisfactory, and selecting a radio base station in the satisfactory reception condition to be communicated with.

2. A mobile communication terminal selecting at least one radio base station from a plurality of radio base stations arranged on the ground, the mobile terminal comprising:

a radio communication function for establishing radio communications with the selected base station;

a positioning function for measuring a position of the mobile terminal based on reference location data from a plurality of location reference stations which are at least one of satellite-based and ground-based, the terminal detecting reception condition of radio waves from the radio base station and a distance to the radio base station, and selecting the radio base station to be radio-communicated with based on the detected results;

means for detecting whether the reception condition of radio waves from a radio base station is satisfactory;

means for searching other one or a plurality of radio stations in satisfactory reception condition when the reception condition of radio waves from the selected radio base station becomes impaired; and means for detecting a distance to each radio base station by means of the positioning function when other one or a plurality of the radio stations in the satisfactory reception condition are found, and selecting a radio base station at the closest distance to be radio-communicated with.

* * * * *